(12) United States Patent
Dervaux et al.

(10) Patent No.: US 7,972,107 B2
(45) Date of Patent: Jul. 5, 2011

(54) DEVICE FOR COOLING A TURBOMACHINE TURBINE CASING

(75) Inventors: Alexandre Nicolas Dervaux, Paris (FR); Philippe Hazevis, Vaudoy en Brie (FR); Renaud Martet, Palaiseau (FR); Philippe Jean-Pierre Pabion, Vaux le Penil (FR); Stephanie Roger, Mormant (FR); Eric Schwartz, Seine Port (FR)

(73) Assignee: SNECMA, Paris (FR)

(*) Notice: Subject to any disclaimer, the term of this patent is extended or adjusted under 35 U.S.C. 154(b) by 1118 days.

(21) Appl. No.: 11/693,270

(22) Filed: Mar. 29, 2007

(65) Prior Publication Data

US 2007/0231123 A1  Oct. 4, 2007

(30) Foreign Application Priority Data

Mar. 30, 2006 (FR) ...................... 06 02749

(51) Int. Cl.
*F01D 25/12* (2006.01)
(52) U.S. Cl. ...................................................... 415/115
(58) Field of Classification Search .................. 415/115, 415/116, 191, 209.2
See application file for complete search history.

(56) References Cited

U.S. PATENT DOCUMENTS

| | | | |
|---|---|---|---|
| 4,173,120 A * | 11/1979 | Grosjean et al. ................ | 60/791 |
| 5,224,818 A * | 7/1993 | Drerup et al. .................. | 415/115 |
| 6,227,798 B1 | 5/2001 | Demers et al. | |
| 6,612,809 B2 * | 9/2003 | Czachor et al. ............... | 415/189 |
| 6,902,371 B2 * | 6/2005 | Anderson et al. ............. | 415/115 |
| 2002/0122716 A1 | 9/2002 | Beacock et al. | |
| 2005/0002779 A1 | 1/2005 | Tanaka | |
| 2006/0093470 A1 * | 5/2006 | Bermond et al. ............. | 415/115 |

FOREIGN PATENT DOCUMENTS

GB  1 322 801  7/1973
WO  WO 01/51771 A2  7/2001

* cited by examiner

*Primary Examiner* — Nathaniel Wiehe
(74) *Attorney, Agent, or Firm* — Oblon, Spivak, McClelland, Maier & Neustadt, L.L.P.

(57) ABSTRACT

A device for cooling a turbine casing in a turbomachine including a turbine is disclosed. The turbine includes several stages, at least one of the stages includes a nozzle assembly formed of an annular row of fixed vanes and an impeller mounted to rotate in a cylindrical shroud formed of ring sectors fixed to the casing, a cooling circuit including ducts carrying cooling air into cavities formed in the vanes of the nozzle assembly, and an air-carrying arrangement which carries air to casing upstream hooks for suspending the ring sectors.

17 Claims, 6 Drawing Sheets

DEVICE FOR COOLING A TURBOMACHINE TURBINE CASING

BACKGROUND OF THE INVENTION AND DESCRIPTION OF THE PRIOR ART

The present invention relates to a device for cooling a turbine casing of a turbomachine, particularly an aviation turbojet engine or turboprop.

A turbine of this type comprises several stages each including a distributor formed of an annular row of fixed vanes borne by the casing of the turbine and an impeller mounted to rotate downstream of the nozzle assembly in a cylindrical shroud formed by ring sectors fixed circumferentially on casing hooks of the turbine via C-shaped or U-shaped fasteners.

The vanes of the first-stage or upstream-stage nozzle assembly are exposed to high temperatures and comprise internal cavities for the flow of cooling air bled off upstream from the turbomachine compressor and carried by ducts to a volume formed in the casing around the turbine upstream nozzle assembly. Cylindrical connecting tubes are mounted in the volume and each connect the volume to an internal cavity of a vane of the upstream nozzle assembly. The cooling air leaves this cavity at the radially internal end of the vane, the trailing edge of which may also comprise orifices opening into the cavity so that the cooling air can leave.

The hooks that secure the ring sectors, and especially those located directly downstream of the vanes of the upstream-stage nozzle assembly are shielded from the heat by an annular sealing plate which is mounted between the ring sectors and the external ends of the vanes of the nozzle assembly in order to restrict the passage of gas from the airstream radially outward into an annular space that houses the casing hooks.

However, sealing is imperfect and leaks of hot gases from the turbine airstream may cause the temperature of the casing hooks to rise and cause cracking or fissuring liable to destroy the hooks.

Furthermore, it would not be possible to fit the turbine with an additional cooling circuit leading cool air bled off upstream of the combustion chamber onto these suspension hooks because of the complexity, limitation on space and costs involved.

SUMMARY OF THE INVENTION

It is a particular object of the invention to respond to this problem simply, effectively and economically.

To this end, the invention proposes a device for cooling a turbine casing in a turbomachine particularly in an aviation turbojet engine or turboprop, this turbine comprising several stages each including a nozzle assembly formed of an annular row of fixed vanes borne by the casing of the turbine and an impeller mounted to rotate inside the casing in a cylindrical shroud formed of ring sectors fixed circumferentially to the casing, and a cooling circuit for cooling the vanes of the nozzle assembly of the upstream stage, comprising ducts for carrying cooling air into cavities formed in the vanes of the nozzle assembly, and means of carrying air to casing upstream hooks for suspending the ring sectors surrounding the impeller of the upstream stage, these air-carrying means connecting the internal cavities of the vanes of the nozzle assembly of the upstream stage to the annular space in which the upstream hooks lie, wherein: the internal cavities of the vanes are closed, at their radially external ends, by plates attached to the nozzle assembly; and the air-carrying means comprise drillings formed in these plates and drillings formed in an external annular rim of the nozzle assembly which extends radially between the radially external walls of the vane cooling cavities and the upstream hooks for suspending the ring sectors.

The air bled from the cavities of the vanes of the casing upstream stage nozzle assembly is carried into the annular space housing the casing upstream hooks and allows their temperature to be brought down, something which results in an appreciable reduction in the risk of cracking or fissuring of the hooks without the need to add ducts carrying cool air to the turbine casing.

This air also makes it possible to keep the annular space in which the hooks are housed at a pressure higher than that of the combustion gases passing through the turbine, and this itself opposes the ingress of these gases into the annular space housing the hooks.

The airflow bled off for cooling the upstream hooks represents a small fraction of the total airflow used for cooling the vanes of the nozzle assembly, and so has very little influence on the cooling of the vanes of the nozzle assembly of the upstream stage and on the output of the turbomachine.

According to another characteristic of the invention, the means for carrying air to the upstream casing hooks are distributed over the periphery of the nozzle assembly and are formed in each fixed vane.

The means of carrying air comprise drillings formed in the plates attached to the radially external ends of the vanes for hermetically closing off the vane cooling cavities of the nozzle assembly of the upstream stage, and drillings formed in the external annular rim of the nozzle assembly which extends radially between the radially external walls of the vane cooling cavities and the upstream hooks for suspending the ring sectors.

The drillings may be formed by electro-discharge machining and have a diameter of between about 0.1 and 5 mm.

In one embodiment of the invention, the drillings formed in the external annular rim of the nozzle assembly extend obliquely with respect to this rim and with respect to the axis of rotation.

These drillings may at their downstream ends open directly into the annular space in which the casing upstream hooks lie.

As an alternative, the drillings are formed at the internal periphery of the external annular rim and at their downstream ends open into an annular passage formed between the external annular rim of the nozzle assembly and an annular deflector attached and fixed to a downstream end part of the nozzle assembly.

The drillings may in this case be formed in the external rim of the nozzle assembly in the immediate vicinity of an external wall of revolution of the nozzle assembly, thus making it possible to avoid creating a thermal gradient in the external rim of the nozzle assembly as such a gradient would result in differential thermal expansion of this rim across its radial spread and in significant stresses in the vanes of the nozzle assembly.

The annular deflector is for example engaged and fixed in an external annular groove of the nozzle assembly and bears axially on the upstream ends of the ring sectors in order to limit the passage of gas from the turbine airstream radially outward into the annular passage that houses the casing hooks.

The annular deflector is advantageously split into sectors and made up of several parts assembled end to end via sealing strips.

In yet another alternative, the drillings formed in the external annular rim of the nozzle assembly are more or less perpendicular to this rim and are supplied with cooling air via slots formed in regions where this rim catches on the casing of the turbine.

The present invention also relates to a turbine for a turbomachine such as an aviation turbojet engine or turboprop and which comprises a cooling device as described hereinabove.

The present invention also relates to a turbomachine turbine upstream nozzle assembly comprising an annular row of vanes which are connected at their radially internal ends to an internal wall of revolution and at their radially external ends to an external wall of revolution, the vanes comprising internal cavities for the flow of cooling air and the external wall comprising an external annular rim at its downstream end which rim is formed with means for catching on a casing of the turbomachine, wherein: the internal cavities of the vanes are closed, at their radially external ends, by plates attached to the external wall of the nozzle assembly; and these plates and the annular rim of the nozzle assembly comprise drillings for the passage of cooling air.

The drillings may be formed at the internal periphery of the annular rim. They may also be formed obliquely or perpendicularly with respect to the annular rim.

An annular deflector may also be fixed to the external wall of revolution of the nozzle assembly downstream of its annular rim.

BRIEF DESCRIPTION OF THE DRAWINGS

The invention will be better understood and other characteristics, details and advantages thereof will become more clearly apparent from reading the description which follows, given by way of nonlimiting example with reference to the attached drawings in which.

DESCRIPTION OF THE PREFERRED EMBODIMENTS

Figure 1:
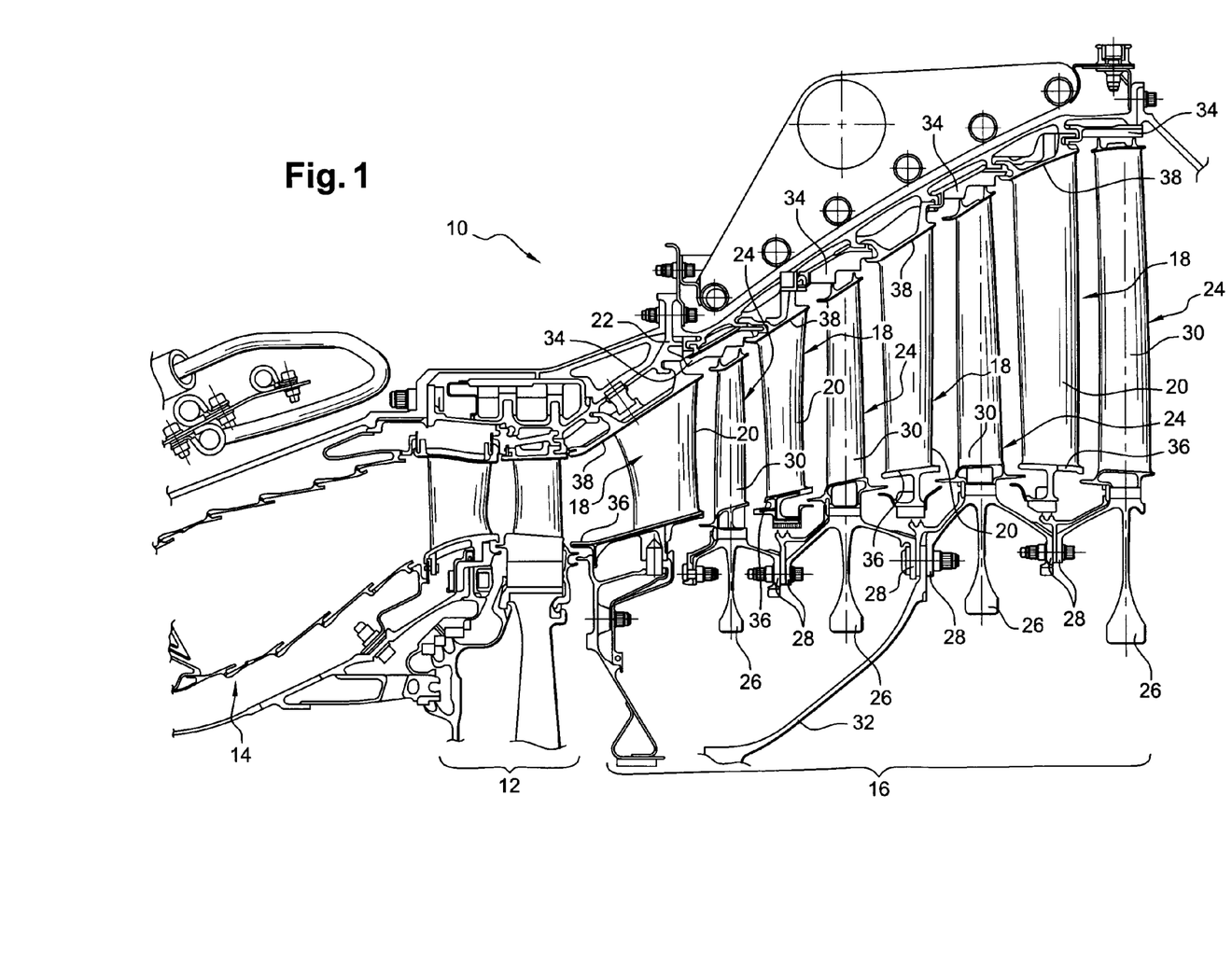
FIG. 1 is a schematic part-view in axial section of a turbomachine equipped with the device according to the invention.

In FIG. 1, the reference 10 denotes a turbine of a turbomachine consisting of a high-pressure module 12 arranged at the outlet of a combustion chamber 14 and of a low-pressure module 16 situated downstream of the high-pressure module 12 and comprising four stages each including a nozzle assembly 18 formed of an annular row of fixed vanes 12 borne by an external casing 22 of the turbine and an impeller 24 downstream of the nozzle assembly 18.

The impellers 24 comprise disks 26 assembled axially with one another by annular flanges 28 and bearing radial vanes 30. The impellers 24 are connected to a turbine shaft (not depicted) by means of a drive cone 32 fixed to annular flanges 28 of the disks 26.

Each impeller 24 is surrounded externally, with a small clearance, by a cylindrical shroud formed of ring sectors 34 fixed circumferentially to the casing 22 of the turbine by means of C-shaped or U-shaped locking pieces as will be described in greater detail hereinafter.

The nozzle assemblies 18 comprise internal and external walls of revolution 36 and 38, respectively, which between them delimit the airstream for the flow of the gases through the turbine and between which the vanes 20 extend radially.

Figures 2, 2A:
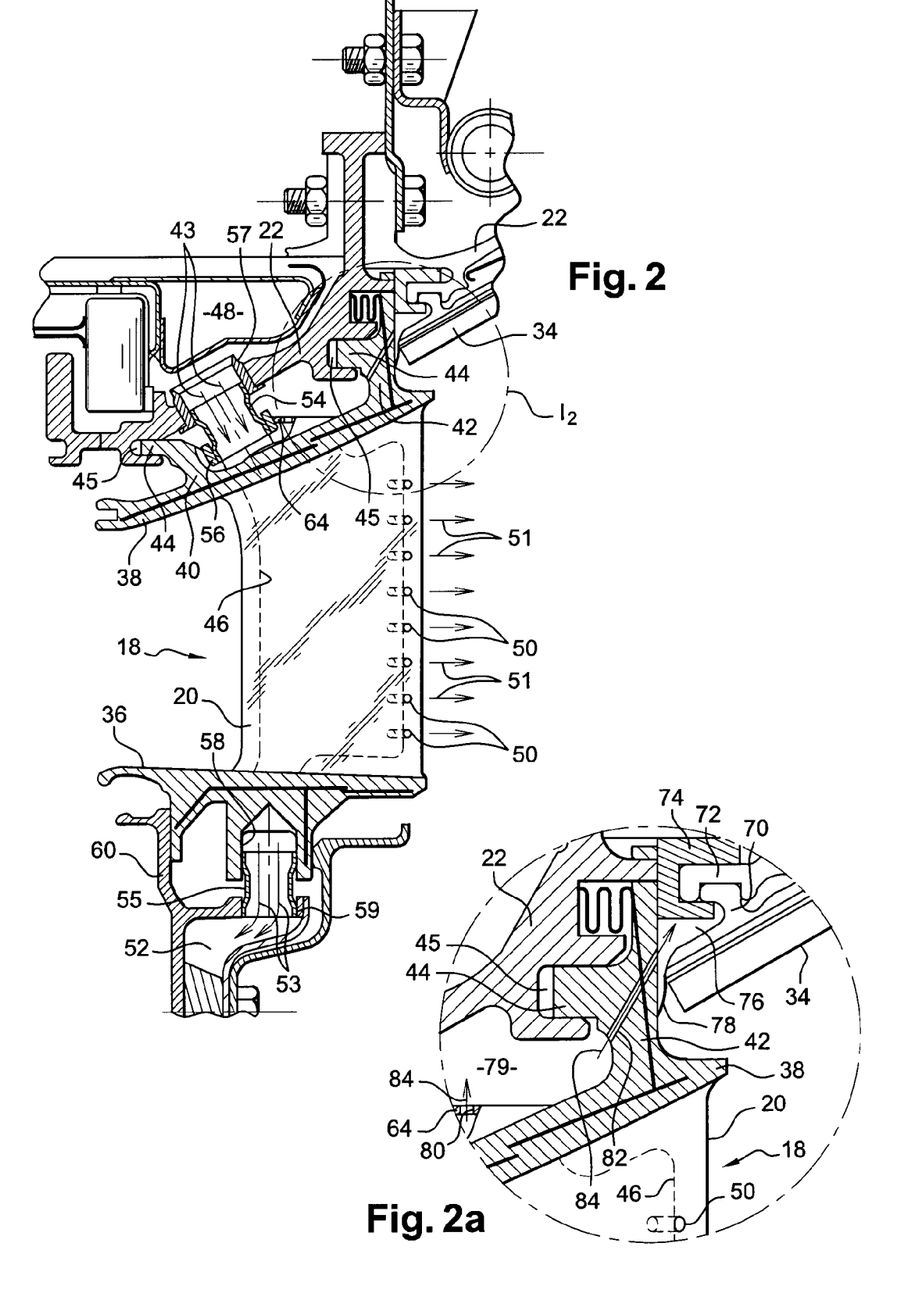
FIG. 2 is a view on a larger scale of part of FIG. 1 and depicts the nozzle assembly of the upstream stage of the turbine.
FIG. 2a is an enlarged view of detail $I_2$ of FIG. 2.

The external wall 38 of the nozzle assembly 18 of the upstream stage best visible in FIG. 2 comprises upstream 40 and downstream 42 radially external annular rims including axial annular lugs 44 directed in the upstream direction and intended to be engaged in corresponding axial annular grooves 45 in the casing 22 of the turbine.

The vanes 20 of this nozzle assembly 18 comprise internal cavities 46 for the circulation of cooling air originating from a supply volume 48 (as depicted by the arrows 43) radially external to the wall 38 of the nozzle assembly, this air being partially removed in the airflow of gases of the turbine through orifices 50 formed near the trailing edge of the vanes 20 and opening into their internal cavities 46 (arrows 51) and partially removed into a volume 52 radially internal to the wall 36 of the nozzle assembly (arrows 53). The cooling air is bled off upstream from a compressor of the turbomachine and carried to the supply volume by ducts which have not been depicted.

The vane cavities 46 are connected to the external 48 and internal 52 volumes by cylindrical tubes 54 and 55 respectively. Each tube 54 for the passage of air between the external volume 48 and the cavity 46 of a vane has one end engaged airtightly in a bushing 56 fixed into an orifice formed in the wall 38 of the nozzle assembly between the external annular rims 40, 42 and opening into the internal cavity 46 of a vane. The other of its ends is engaged airtightly in a bushing 57 fixed in an orifice formed in the casing 22 of the turbine. The tubes 55 for the passage of air between the cavities 46 of the vanes and the internal volume 52 have their ends engaged airtightly in orifices 58, 59 in the wall 36 of the nozzle assembly and of an annular rim of a casing 60 of the volume 52, respectively.

Figure 3:
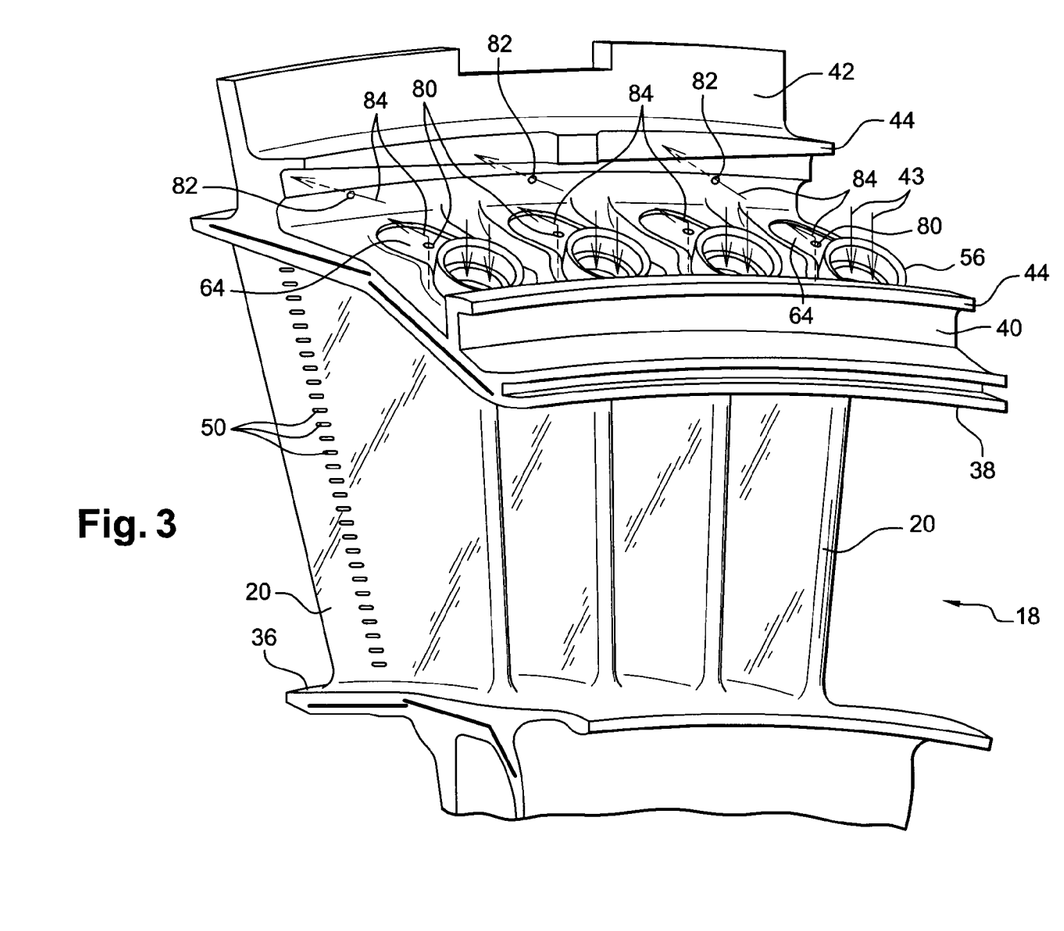
FIG. 3 is a schematic part-view in perspective of the nozzle assembly of the upstream stage of the turbine, viewed in side view and from the upstream end.

The cavity 46 of each vane of the nozzle assembly 18 comprises an opening formed in the external wall 38 of the nozzle assembly near the orifice in which the bushing 56 is fixed. A plate 64 is attached and fixed to the wall 38 as can be seen in FIG. 3 in order to hermetically close off the vane cavity 46.

The ring sectors 34 situated directly downstream of the nozzle assembly 18 of the upstream stage (FIGS. 2 and 2a) each comprise, at their upstream ends, a circumferential hook 70 in the form of a portion of a cylinder which is pressed against a corresponding circumferential hook 72 in the form of a portion of a cylinder belonging to the casing 22 and is held in place by a C-shaped or U-shaped fastener 74 engaged via the upstream side over the circumferential hooks 70 and 72.

The fasteners 74 and the hooks 70, 72 are housed in an annular space 76 which extends around the ring sectors 34 between the casing and the nozzle assembly 18, the fasteners 74 bearing at their upstream ends against a downstream face of the downstream annular rim 42 of the external wall 38 of the nozzle assembly.

The fasteners 74 and the circumferential hooks 70 and 72 of the ring sectors 34 and of the casing 22 are shielded from the heat by an annular sealing sheet 78 which is mounted between the ring sectors 34 and the downstream face of the annular rim 42 of the nozzle assembly in order to restrict the passage of gas from the turbine airflow radially outward into the annular space 76 that houses the casing hooks 72.

The casing hooks 72 are, in service, subjected to high temperatures which may cause cracking or fissuring liable to destroy them.

The invention provides a simple solution to this problem by virtue of means for carrying cooling air to these hooks.

In a first embodiment of the invention as depicted in FIGS. 2 and 3, these means comprise drillings 80 formed in the plates 64 of each vane and drillings 82 formed obliquely in the downstream external rim 42 of the external wall 38 of the nozzle assembly to connect the internal cavities 46 of the vanes to the annular space 76 housing the hooks 70, 72, the drillings 80 and 82 being uniformly distributed about the axis of the turbine.

In the example depicted, each plate 64 comprises, more or less in the middle, a cylindrical drilling 80 (FIG. 3) directed more or less radially with respect to the axis of the turbine and opening at one end into the cavity 46 of the corresponding vane and at its other end into an annular passage 79 situated radially outside the wall 38 of the nozzle assembly and bounded axially by the external annular rims 40, 42 of the nozzle assembly. As an alternative, just some of the plates may have drillings 80 or the plates may comprise two drillings 80 or more. The drillings could equally be inclined with respect to the axis of the turbine and, for example, directed downstream and outward.

The drillings 82 formed in the external annular rim 42 of the nozzle assembly 18 are oblique with respect to the axis of the turbine and directed downstream and outward. At their upstream end they open into the annular passage 79 and at their downstream ends they open onto an internal cylindrical face of the fasteners 74 fitted over the hooks 70, 72.

A small fraction of the airflow circulating through the cavities 46 of the vanes of the nozzle assembly 18 enters the annular passage 79 through the drillings 80 in the plates 64, then enters the annular space 76 housing the hooks 70, 72 through the drillings 82 in the annular rim 42 of the nozzle assembly as depicted by the arrows 84. The hooks 72 are thus cooled sufficiently to eliminate the risk of cracking or fissuring of the hooks.

This supply of air also makes it possible to keep the annular space 76 housing the hooks at a pressure higher than that of the hot gases flowing through the turbine, thus opposing the passage of these gases between the ring sectors 34 and the annular rim 42 of the nozzle assembly 18 at the annular sealing sheet 78.

The number of drillings 80 formed in the plates 64 in the example depicted is greater than the number of drillings 82 formed in the annular rim 42 of the nozzle assembly 18. The number of drillings 80 is, for example, about 96, and the number of drillings 82 is, for example, about 72.

As an alternative, the number of drillings 80 formed in the plates 64 may be equal to or lower than the number of drillings 82 formed in the annular rim 42 of the nozzle assembly 18.

Figures 4, 4A:
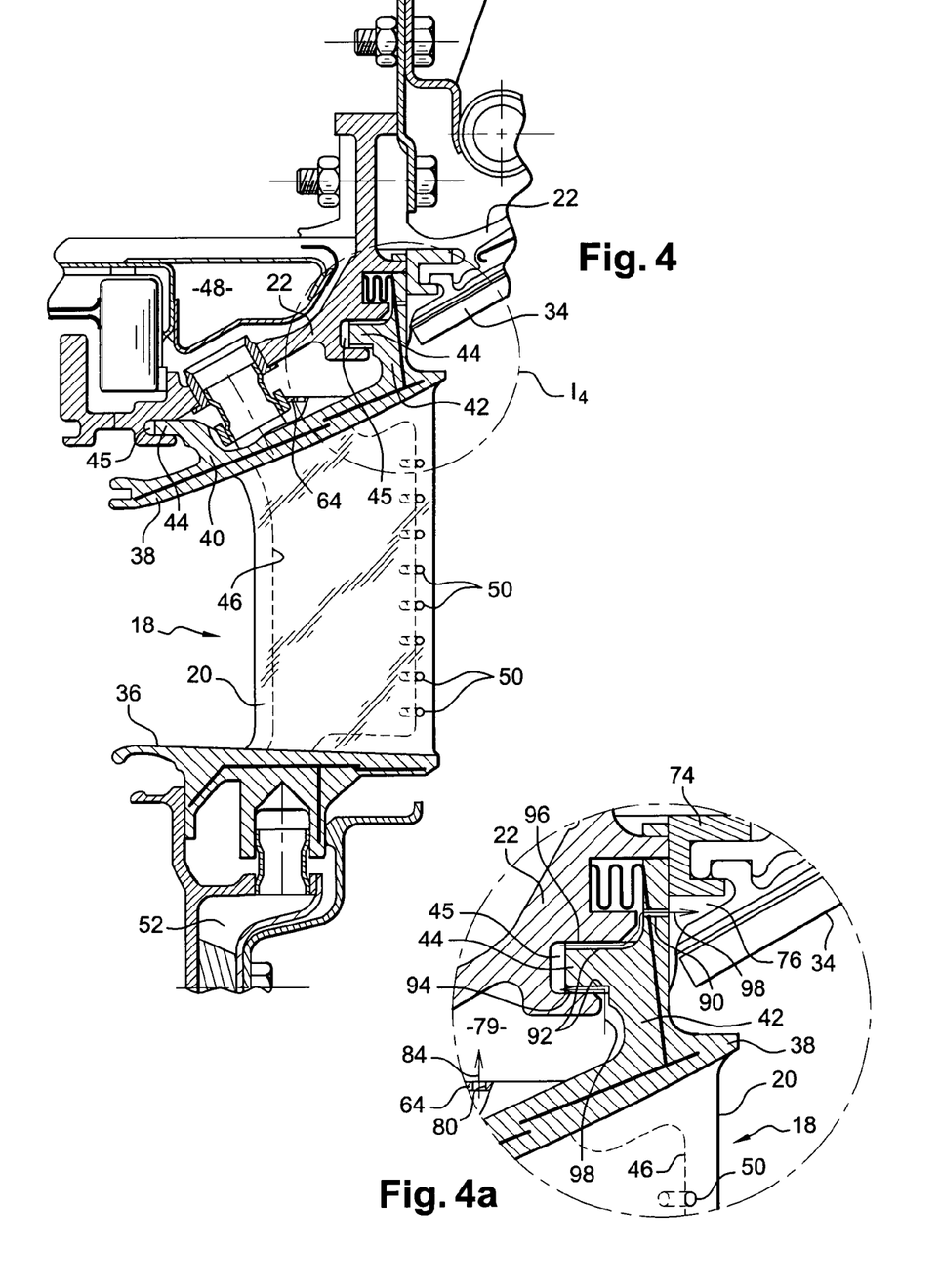
FIG. 4 is a view corresponding to FIG. 2 and depicts an alternative form of embodiment of the device according to the invention.
FIG. 4a is an enlarged view of detail $I_4$ of FIG. 4.

In the alternative form of embodiment of the invention depicted in FIGS. 4 and 4a, the drillings 80 formed in the plates 64 of the nozzle assembly are identical to those described with reference to FIGS. 2, 2a and 3 and the annular passage 79 is connected to the annular space 76 housing the hooks by way of axial drillings 90 formed in the external annular rim 42 of the nozzle assembly and of axial slots 92 formed in the annular lugs 44 of this external rim 42. The drillings 90 and the slots 92 are uniformly distributed about the axis of the turbine.

The drillings 90 formed in the external annular rim 42 of the nozzle assembly 18 are more or less parallel to the axis of the turbine and perpendicular to the rim 42 and at their upstream ends open onto an upstream face of the annular rim 42 which face lies radially on the outside of the annular catching lug 44 and at their downstream ends they open onto the downstream face of the annular rim 42 in the annular space 76 housing the hooks 70, 72.

The slots 92 are formed in internal 94 and external 96 cylindrical surfaces of the annular lug engaged in the annular groove 45 of the casing 22.

The slots 92 on the external cylindrical surface 96 at their downstream ends open in the vicinity of the upstream ends of the drillings 90 and at their upstream ends open into the bottom of the groove 45, and the slots on the internal cylindrical surface 94 at their upstream ends open into the bottom of the groove 45 and at their downstream ends open into the annular passage 79.

In the example depicted, each drilling 90 is associated with two slots 92 formed in the internal 94 and external 96 cylindrical surfaces of the annular lug 44, respectively, which may or may not lie in the same radial plane as the drilling 90.

The air in the annular passage 79 originating from the internal cavities 46 of the vanes is carried into the annular space 76 housing the hooks by the slots 92 on the internal then external surfaces of the annular lug 44 of the external rim 42 of the nozzle assembly, then by the drillings 90 in the external rim 42, as depicted by the arrows 98.

As an alternative, it is possible for the slots 92 not to be parallel to the axis of the turbine. These slots 92 could also be formed on the cylindrical surfaces of the groove 45 against which the cylindrical surfaces 94, 96 of the annular lug 44 rest, these slots opening into the annular passage 79 and in the vicinity of the drillings 90 as described previously.

Figure 5:
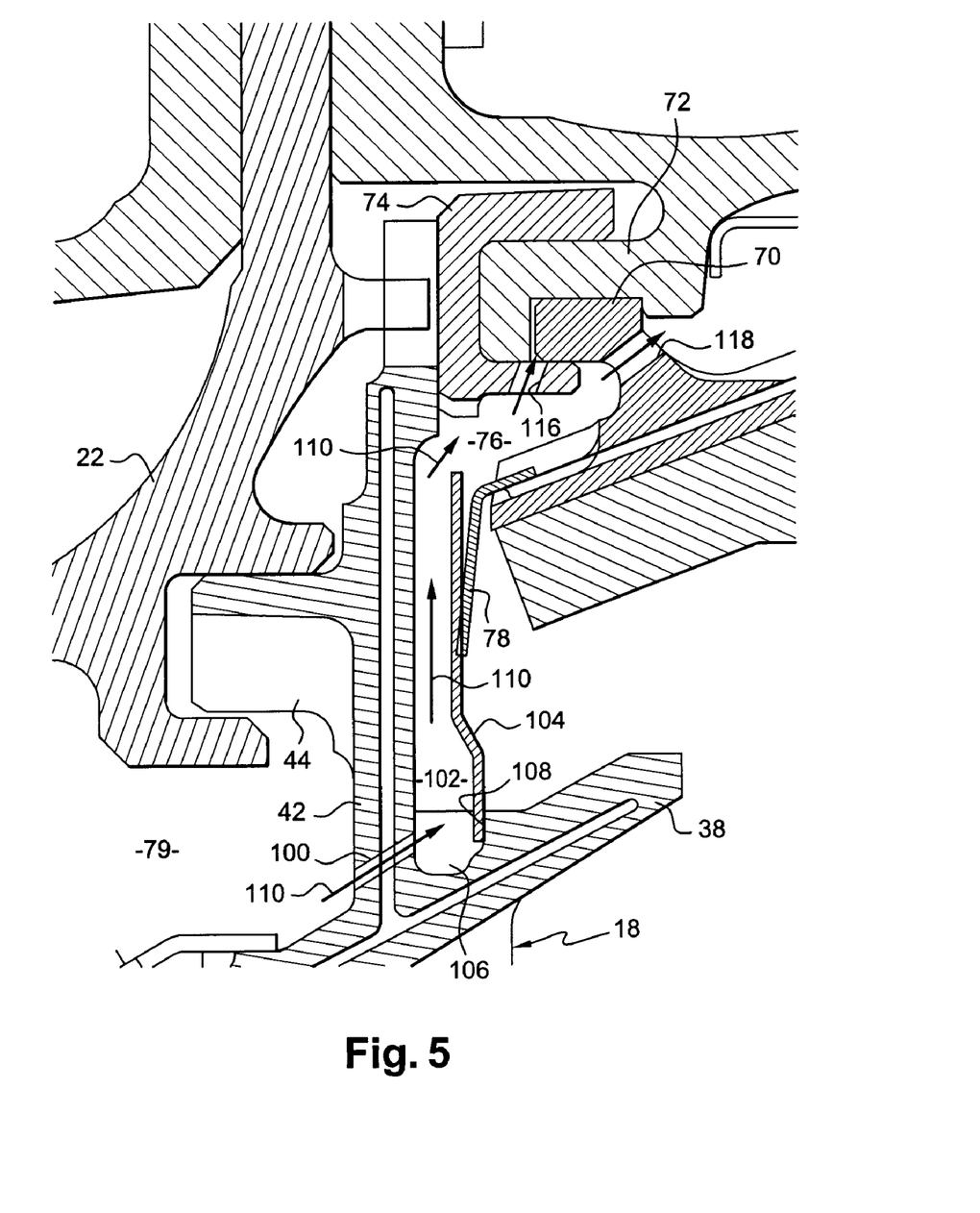
FIG. 5 is a schematic part-view in axial section of another alternative form of embodiment of the device according to the invention.
Figure 6:
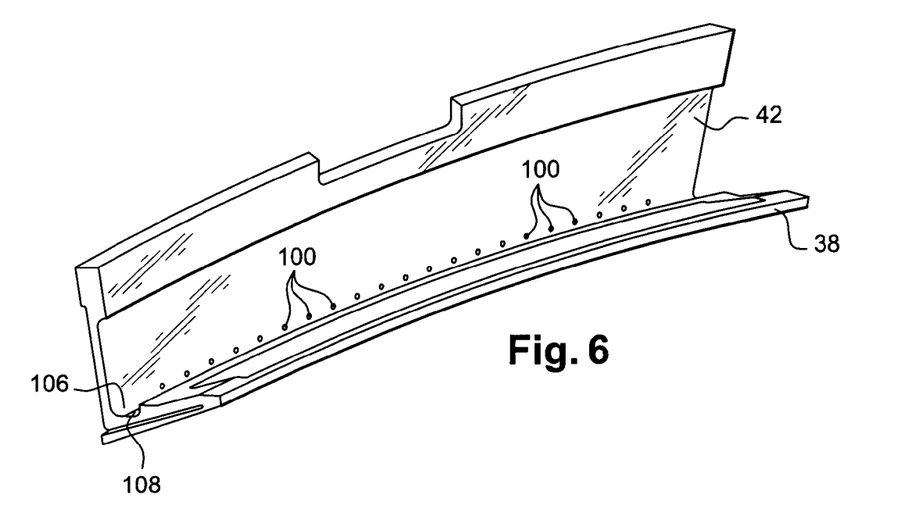
FIGS. 6 and 7 are schematic part-views in perspective of the external annular rim of the nozzle assembly of FIG. 5.
Figure 7:
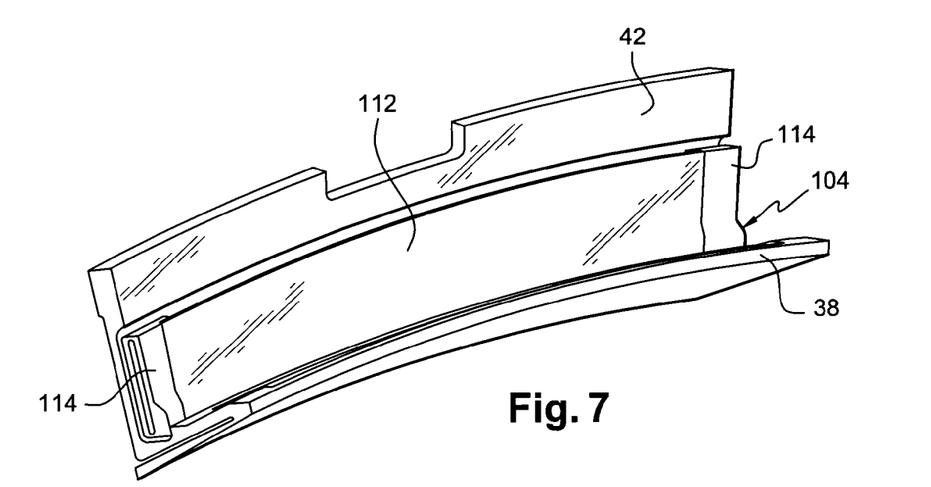

In the alternative form depicted in FIGS. 5 to 7, the drillings 100 of the external angular rim 42 of the nozzle assembly 18 are not formed in the central or radially external part of the rim 42 but are formed in the immediate vicinity of the external wall 38 of the nozzle assembly and extend more or less parallel to this wall.

The drillings 100 at their upstream ends open into the annular passage 79 and at the downstream ends open into a second annular passage 102 running transversely with respect to the axis of the turbine and communicating at its external periphery with the annular space 76 that houses the hooks 72.

The annular passage 102 surrounds the external wall 38 of the nozzle assembly and is axially bounded by the rim 42 of the nozzle assembly and by a deflector 104 attached and fixed to the external wall 38 of the nozzle assembly, downstream of the external rim 42.

In the example depicted, the drillings 100 at their downstream ends open into an annular groove 106 opening outward and formed in the external wall 38 of the nozzle assembly, downstream of the rim 42, and also comprising a radial wall 108 to which a radially internal end part of the deflector 104 is pressed and fixed by brazing or welding.

The deflector 104 is axially preloaded through the pressing of its radially external end part against the annular sealing sheet 78 mounted on the upstream ends of the ring sectors 34, so as to limit the passage of gas from the turbine airflow radially outward into the annular space 76 housing the hooks 70, 72.

As an alternative, the deflector 104 can bare axially directly on the downstream ends of the ring sectors 34.

Air from the first annular passage 79 enters the second annular passage 102 through the drillings 100 and is then carried into the annular space 76 housing the hooks as depicted by the arrows 110.

In the example depicted in FIG. 6 the number of drillings 100 is greater than the number of drillings 80 formed in the plates 64 (FIG. 3). The number of drillings 100 lies for example between 360 and 504.

The deflector 104 is preferably split into sectors and formed of a plurality of parts 112 assembled end to end by means of sealing strips.

In the example depicted in FIG. 7, the parts 112 are associated at each of their ends with means 114 into which a sealing strip can fit (although this is not depicted), each strip being engaged at one end in the means 114 of one part 112 and at an opposite end in the means 112 of an adjacent part 114.

The fasteners 74 and the hooks 70 on the ring sectors 34 may also comprise drillings 116 and 118 for the passage of air in order to cool the hooks 72 of the casing 22 (FIG. 5).

The drillings 80, 82, 90, 100, 116 and 118 have a diameter ranging between about 0.1 and 5 mm and may be formed by electro-discharge machining or by any other appropriate technique.

The embodiment of FIGS. 5 to 7 makes it possible to avoid the creation of a thermal gradient in the external annular rim 42 of the nozzle assembly, something which would result in differential thermal expansion of this rim across its radial spread and in stresses in the vanes of the nozzle assembly 18. The high number of drillings 100 allows the temperature over the internal periphery of the rim 42 to be evened out and allows this temperature to be lowered considerably.

The deflectors 104 allow the air used to cool the rim 42 to be recovered for cooling the casing hooks 72. A slight increase in the cooling air flow rate compensates for the fact that the air is warmed a little by cooling the annular rim 42, without detracting from engine performance.

The invention claimed is:

1. A device for cooling a turbine casing in a turbomachine, comprising:
    a turbine including several stages, at least one of the stages including
        a nozzle assembly formed of an annular row of fixed vanes, radially extending between an internal wall of revolution and an external wall of revolution, borne by the casing of the turbine and an impeller mounted to rotate inside the casing in a cylindrical shroud formed of ring sectors fixed circumferentially to the casing,
        a cooling circuit which cools the vanes of the nozzle assembly of an upstream stage, the cooling circuit including ducts which carry cooling air into internal cavities formed in the vanes of the nozzle assembly, a first end of the duct being engaged in an orifice disposed in the casing of the turbine and a second end of the duct being engaged in an orifice disposed in the external wall of revolution, and
        an air-carrying arrangement which carries air to casing upstream hooks which suspend the ring sectors surrounding the impeller of the upstream stage, the air-carrying arrangement connecting the internal cavities of the vanes of the nozzle assembly of the upstream stage to the annular space in which the upstream hooks lie,
    wherein radially external ends of the internal cavities of the vanes are closed by plates attached to the nozzle assembly and
    wherein the air-carrying arrangement includes a first set of drillings disposed in the plates and a second set of drillings disposed in an external downstream annular rim provided on the external wall of revolution which extends radially between the radially external ends of the internal cavities and the upstream hooks for suspending the ring sectors.

2. The device as claimed in claim 1, wherein the air-carrying arrangement is distributed over the periphery of the nozzle assembly and is formed in each fixed vane.

3. The device as claimed in claim 1, wherein the drillings are formed by electro discharge machining.

4. The device as claimed in claim 1, wherein the second set of drillings disposed in the external annular rim of the nozzle assembly extend obliquely with respect to this rim and with respect to the axis of rotation.

5. The device as claimed in claim 4, wherein the second set of drillings at their downstream ends open directly into the annular space in which the upstream hooks lie.

6. The device as claimed in claim 1, wherein the second set of drillings are formed at the internal periphery of the external annular rim and at their downstream ends open into an annular passage formed between the external annular rim of the nozzle assembly and an annular deflector attached and fixed to a downstream end part of the nozzle assembly.

7. The device as claimed in claim 6, wherein the annular deflector is engaged and fixed in an external annular groove of the nozzle assembly and bears axially on the upstream ends of the ring sectors.

8. The device as claimed in claim 6, wherein the annular deflector is split into sectors and made up of several parts assembled end to end via sealing strips.

9. The device as claimed in claim 1, wherein the drillings formed in the external annular rim of the nozzle assembly are more or less perpendicular to this rim and are supplied with cooling air via slots formed in regions where this rim catches on the casing of the turbine.

10. A turbine for a turbomachine comprising a cooling device as claimed in claim 1.

11. A turbomachine which comprises a cooling device as claimed in claim 1.

12. The device as claimed in claim 1, wherein a first end of the first set of drillings opens into the cavity formed in the vane and a second end of the first set of drillings opens into an annular passage which is situated radially outside the external wall of revolution and is bounded axially by the external downstream annular rim and an external upstream annular rim provided on the external wall of revolution, such that a portion of the cooling air circulating through the cavity formed in the vane enters the annular passage.

13. The device as claimed in claim 12, wherein an upstream end of the second set of drillings opens into the annular passage and a downstream end of the second set of drillings opens into the annular space in which the upstream hooks lie.

14. A turbomachine turbine upstream nozzle assembly comprising:
    an annular row of vanes including internal cavities for the flow of cooling air;
    an internal wall of revolution connected to radially internal ends of the vanes;
    an external wall of revolution connected to radially external ends of the vanes, the external wall including an external annular rim at its downstream end with an axial annular lug which engages a casing of the turbomachine and a orifice through which a cylindrical tube is engaged,
    wherein radially external ends of the internal cavities of the vanes are closed by plates attached to the external wall of the nozzle assembly; and the plates include a first set of drillings and the annular rim of the nozzle assembly includes a second set of drillings for the passage of cooling air.

15. The nozzle assembly as claimed in claim 14, wherein the second set of drillings are formed at the internal periphery of the annular rim.

16. The nozzle assembly as claimed in claim 14, wherein the second set of drillings are formed obliquely or perpendicularly with respect to the annular rim.

17. The nozzle assembly as claimed in claim 14, wherein an annular deflector is fixed to the external wall of revolution downstream of the annular rim.

* * * * *